US007358625B2

(12) United States Patent
Cheng et al.

(10) Patent No.: US 7,358,625 B2
(45) Date of Patent: Apr. 15, 2008

(54) POWER STRIP WITH 12 VOLT OUTLET

(75) Inventors: Charles Cheng, Carmel, IN (US); Shiao-Tsun Ku, Fishers, IN (US); Dan Altheimer, Milwaukee, WI (US)

(73) Assignee: Woods Industries, Inc., Carmel, IN (US)

( * ) Notice: Subject to any disclaimer, the term of this patent is extended or adjusted under 35 U.S.C. 154(b) by 484 days.

(21) Appl. No.: 11/011,928

(22) Filed: Dec. 14, 2004

(65) Prior Publication Data

US 2006/0126243 A1 Jun. 15, 2006

(51) Int. Cl.
*H02J 1/10* (2006.01)

(52) U.S. Cl. .......................................... 307/18; 307/38

(58) Field of Classification Search .................... 307/2, 307/18, 38

See application file for complete search history.

(56) References Cited

U.S. PATENT DOCUMENTS

| | | | | |
|---|---|---|---|---|
| 4,276,605 | A | | 6/1981 | Okamoto et al. |
| 4,438,498 | A | | 3/1984 | Sekel et al. |
| 4,774,647 | A | * | 9/1988 | Kovacik et al. ............ 362/295 |
| D301,576 | S | | 6/1989 | Wang |
| 4,867,701 | A | | 9/1989 | Wiand |
| 5,071,367 | A | | 12/1991 | Luu |
| 5,115,368 | A | | 5/1992 | Smith |
| 5,131,857 | A | | 7/1992 | Gmelin et al. |
| 5,317,691 | A | * | 5/1994 | Traeger ...................... 709/250 |
| 5,397,999 | A | | 3/1995 | Kanamaru |
| D368,893 | S | | 4/1996 | Harwood et al. |
| 5,525,913 | A | | 6/1996 | Brooks et al. |
| 5,526,225 | A | | 6/1996 | Wang |
| 5,539,821 | A | | 7/1996 | Blonder |
| 5,595,494 | A | | 1/1997 | Wiebe |
| 5,610,532 | A | | 3/1997 | Smith |
| D382,856 | S | | 8/1997 | Harwood et al. |
| 5,710,701 | A | | 1/1998 | Brown |
| 5,721,934 | A | | 2/1998 | Scheurich |
| 5,780,775 | A | | 7/1998 | Yu |
| 5,789,934 | A | | 8/1998 | Kolkowski et al. |
| 5,848,915 | A | | 12/1998 | Canizales |
| 5,866,956 | A | | 2/1999 | Marsh et al. |
| 5,906,517 | A | | 5/1999 | Crane et al. |
| D411,511 | S | | 6/1999 | Rossman et al. |
| D412,488 | S | | 8/1999 | Lien |
| 6,086,397 | A | | 7/2000 | Chapman et al. |
| 6,113,434 | A | | 9/2000 | Pate |
| 6,118,295 | A | | 9/2000 | Murayama et al. |
| D435,517 | S | | 12/2000 | Stekelenburg |
| 6,164,996 | A | | 12/2000 | Yu |
| 6,191,967 | B1 | | 2/2001 | Katayama et al. |
| 6,198,302 | B1 | | 3/2001 | Dougherty |

(Continued)

*Primary Examiner*—Robert L. Deberadinis
(74) *Attorney, Agent, or Firm*—Thompson Coburn LLP; Joseph M. Rolnicki, Esq.

(57) ABSTRACT

An electrical power strip includes a housing, an AC power source (e.g. a male plug or power cord), an AC outlet, a converter, and a 12 VDC outlet. The AC outlet and the converter receive power from the AC power source. The converter converts the AC power (e.g. 120 VAC) to 12 VDC and supplies the converted power to the 12 VDC outlet, which may be a cigarette lighter outlet. The housing exterior defines a cradle to receive a 12 VDC device. A handle is also included on the power strip.

21 Claims, 3 Drawing Sheets

U.S. PATENT DOCUMENTS 6,236,226 B1 5/2001 Hagiwara
D443,591 S 6/2001 Tong et al.
D444,126 S 6/2001 Chura et al.
D445,400 S 7/2001 Tong et al.
6,262,590 B1 7/2001 Yamamoto
D446,189 S 8/2001 Lee
D446,503 S 8/2001 Lee
6,320,404 B1 11/2001 Kataoka
6,339,340 B1 1/2002 Hsu
D458,225 S 6/2002 Stekelenburg
6,406,308 B1 6/2002 Wang
6,456,106 B1 9/2002 Yee
6,486,407 B1 11/2002 Hawker et al.
6,504,395 B1 1/2003 Johnson
6,573,617 B2 6/2003 Jones et al.
6,590,788 B2 7/2003 Mercier
7,081,006 B2 * 7/2006 Lichtscheidl et al. ....... 439/501
7,140,922 B2 * 11/2006 Luu et al. .................. 439/651
2002/0154520 A1 10/2002 Mercier

* cited by examiner

POWER STRIP WITH 12 VOLT OUTLET

FIELD OF THE INVENTION

The present invention relates to electrical connectors, such as a power strips, having at least one receptacle, or outlet, for receiving electrical plugs of various tools or appliances.

BACKGROUND OF THE INVENTION

Conventional power strips and surge protectors, which enable a number of electrical devices to be connected to a single power source, are well known. Power strips are frequently used where there are numerous electrical devices in close proximity that all demand power simultaneously. For example, power strips that include surge protectors are commonly used in households for electrical devices such as entertainment centers and computers. Power strips without surge protection are frequently used for lamps, tools, and small appliances. Common power strips include an elongated housing with a plurality of outlets aligned in rows along one or more surfaces of the strip. Each outlet is configured to receive an electrical plug of a tool or appliance. When coupled to the power strip, the plug typically extends upward from, and transverse to, the top surface of the housing. The strip further includes a power cord with one end fitted with a male electrical plug to obtain power from a traditional electricity source and the other end connected to the housing. Conventional power strips also sometimes include a switch which can be used to turn off power to the plurality of outlets when the power strip is plugged in to a power source.

Also, quite often on construction sites, the nearest electrical power supply can be a long distance from electric tools being used. This situation requires that extension cords be run to facilitate the use of electric tools on the site. Conventional power strips are used on these construction sites so that separate extension cords do not have to be used for each electric device. Power strips are placed on the construction site near the workers so that they have quick and convenient access to many electrical outlets. This enables numerous construction workers to plug in their electrical devices simultaneously without disrupting the power supply for other workers.

Recently, portable phones have become indispensable tools for many contractors. These contractors depend on their portable phones while working on construction sites for communications with architects, landowners, and other contractors. These communications are essential to the success of the contractor's business. This dependency on the portable phone often leads to a situation where the portable phone must be recharged during the day or while the contractor is otherwise on the construction site. In the past, contractors would return to their vehicle and plug their cell phone into a nominal 12 volt (which typically operates at approximately 12-14 VDC) charger that in turn plugs into the vehicle's cigarette lighter. This method is problematic for numerous reasons. First, the contractor has to return to the vehicle if the portable phone rings and often misses the call as a result. Second, the charger places a strain on the battery of the vehicle that, over an extended period of time (e.g. a weekend), can drain the vehicle battery, particularly if the vehicle battery is old or during winter weather. Third, the contractor has to return to the vehicle to drop off the phone if it runs out of battery power during the middle of the work shift.

To solve these problems, the contractor sometimes obtains a charger that can be plugged in to a conventional power strip at the construction sites. However, this means that an electrical outlet on the power strip is occupied by the cell phone charger and is thus unavailable for powering tools. Also, if all of the outlets had devices plugged in to them, the contractor must determine which of the devices was not currently in use and could be unplugged without interfering with the ongoing construction activity in order for the contractor to plug in the cell phone charger. Accordingly, mistakes are sometimes made and tools unplugged while in use.

Accordingly, there is a need for a device that will accept a construction worker's or contractor's portable phone and charger and is convenient to the construction site.

SUMMARY OF THE INVENTION

In a first preferred embodiment, the present invention provides electrical power strips with multiple electrical outlets for plugging in various electrical devices, one or more 12 volt outlets for plugging in a portable phone charger, and a cradle in which to place a portable phone.

In a second preferred embodiment, a power strip including a housing, an AC power source (e.g. a male plug or power cord), a power outlet, a power converter, and a 12 VDC outlet is provided. The power outlet and the converter receive power from the power source. The converter converts the AC power (from any of a variety of nominal voltages) to 12 VDC and supplies the converted power to the 12 VDC outlet. Preferably, the 12 VDC outlet is a cigarette lighter socket on the power strip. The housing may define a cradle to receive a 12 VDC device. Also, the outlets may be switched. In an alternative embodiment, the power strip may be adapted to receive multi-phase AC power with a frequency of 50 or 60 Hz. A handle may also be included on the power strip. In another embodiment, an AC power strip includes a cradle for receiving a 12 VDC device and may optionally include a 12 VDC outlet.

In a third preferred embodiment, the present invention provides a trouble light that includes a housing, a power source, a light, a power converter, and a 12 VDC outlet. The light and the converter receive AC power from the power source. Again, the converter converts the AC power to 12 VDC and supplies the converted power to the 12 VDC outlet. Optionally, the trouble light includes a power outlet that also receives AC power from the power source.

In another preferred embodiment, the present invention provides a method of powering a 12 VDC device. The method includes receiving AC power with a power strip and converting the AC power to 12 VDC. Also, the method includes plugging the 12 VDC device into a 12 VDC power outlet on the power strip and having AC power available on the power strip. As an option, the device may be received by a cradle on the power strip.

In still another preferred embodiment, the present invention provides a method of providing power to a plurality of devices. The method of the current embodiment includes receiving AC power with a power strip and having the AC power available at an outlet of the power strip. The method also includes receiving a 12 VDC device with a cradle defined by the power strip. Optionally, the method of the current embodiment includes converting some of the AC power to 12 VDC and plugging the device into a 12 VDC power outlet on the power strip.

In still another preferred embodiment, the present invention provides a power strip including a housing and an electrical cord having a first end configured and adapted for coupling with an electrical power source and a second end connected to the housing. A plurality of conventional outlets and a 12 volt socket are formed in the housing to provide electrical power to connected elements, such as power tools, floodlights, etc. A cradle defined by the housing is configured and adapted to receive a portable device, such as a cellular telephone. The housing may be formed of metal, plastic or any other suitable material, and may further include a rubberized, protective overmold having a handle. In one preferred aspect, the power strip includes at least six conventional AC electrical outlets and a single 12-volt DC outlet.

DETAILED DESCRIPTION OF THE PREFERRED EMBODIMENT

Figure 1:
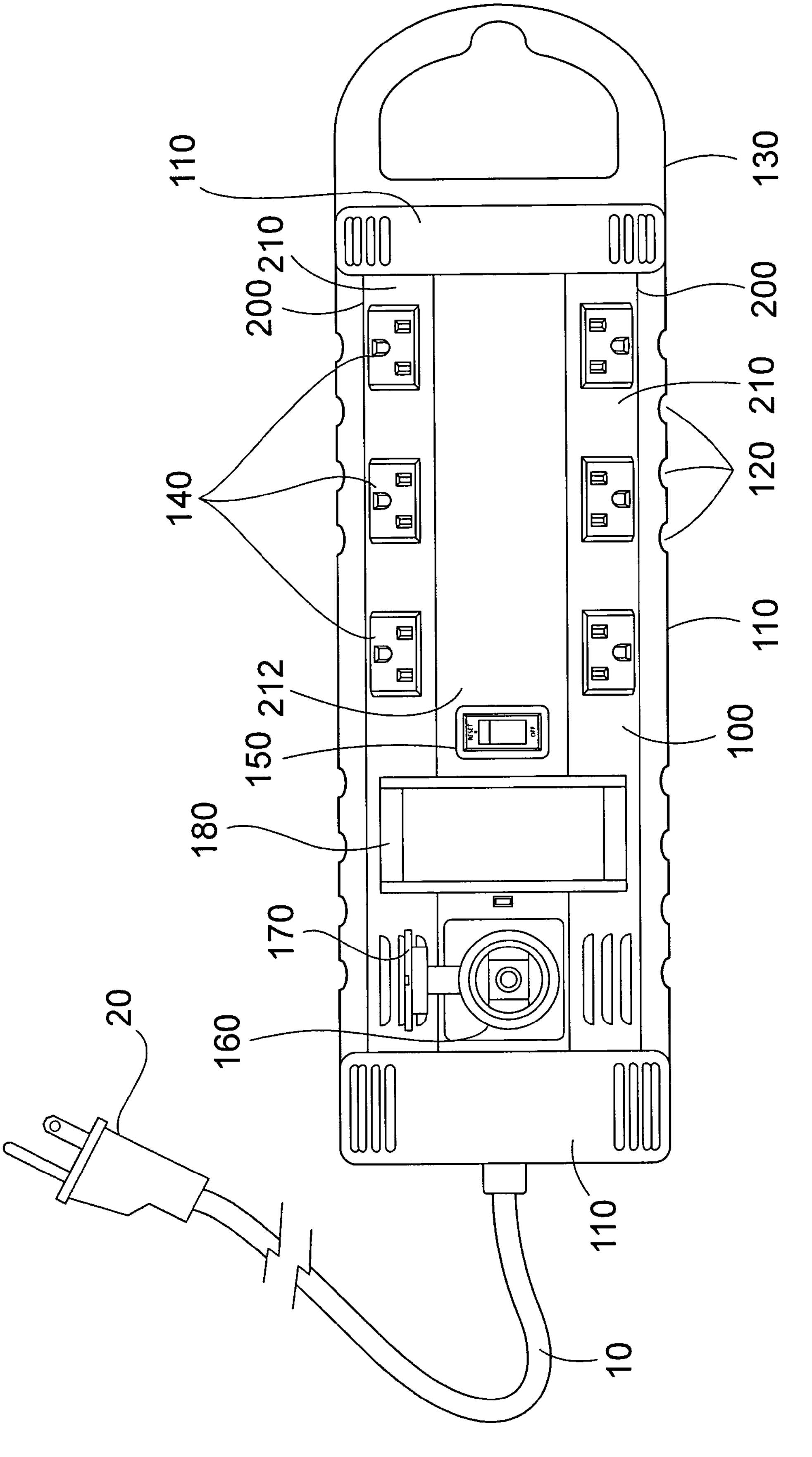
FIG. 1 is a plan view of a power strip with a 12 volt power supply socket and a cradle constructed in accordance with the present invention.
Figure 3:
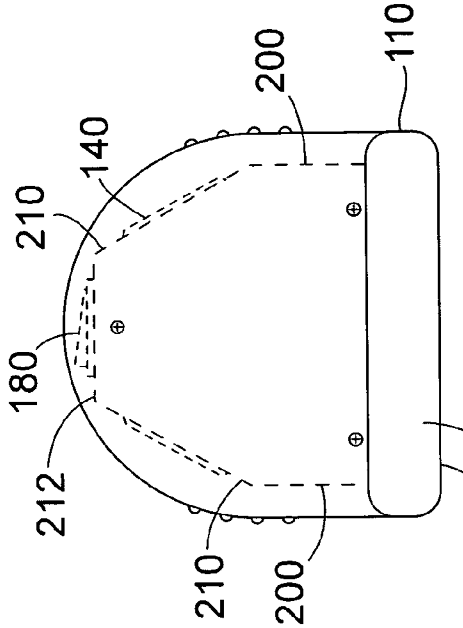
FIG. 3 is an end elevation view as seen from the right hand end of the power strip shown in FIGS. 1 and 2.
Figure 2:
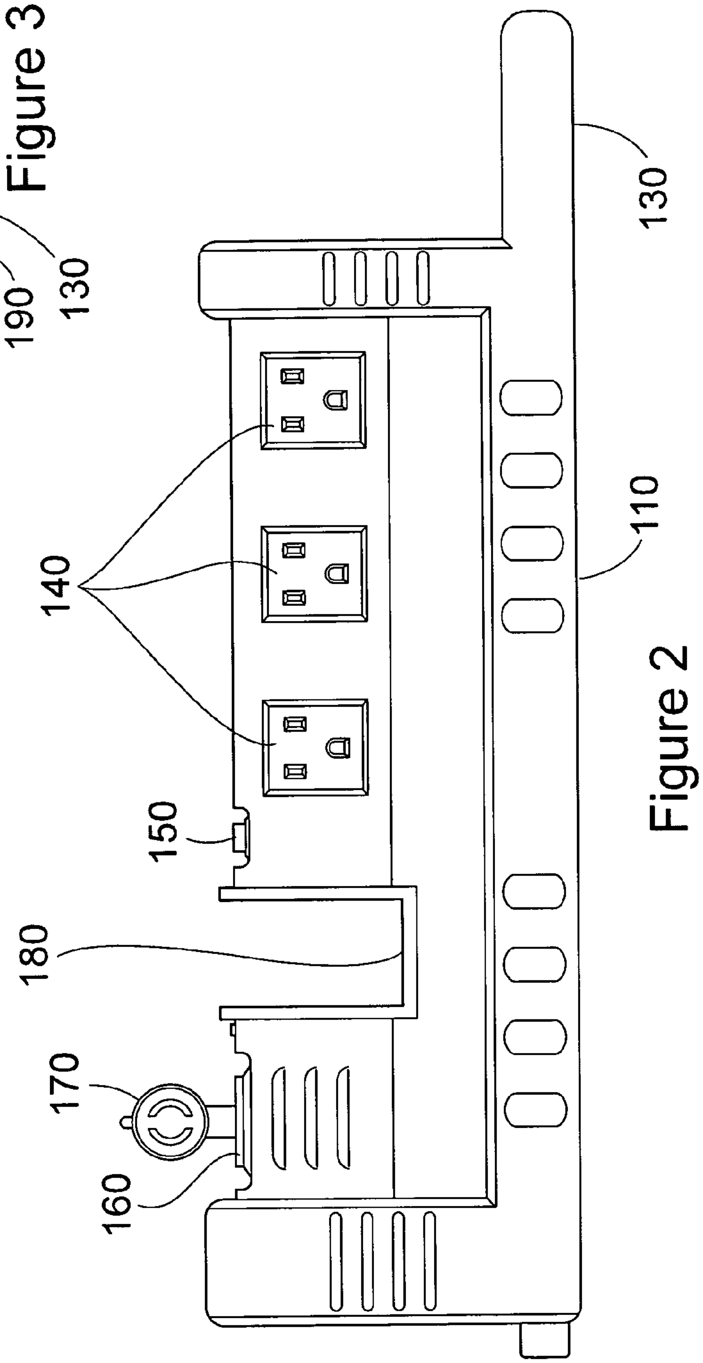
FIG. 2 is a side elevation view of the power strip shown in FIG. 1 with the cord omitted for the purpose of clarity.

An electrical power strip with a 12 volt power supply and cradle in accordance with the present invention is shown in FIGS. 1-3.

The power strip of FIGS. 1-3 includes a power cord 10 which is preferably ten feet in length. The power cord has at its first end a standard three prong male connector 20 for connecting to an external power source such as an outlet or extension cord. The power cord 10 is mechanically coupled at its second end to an outer housing 100 of the power strip which makes up the body of the power strip. Preferably, the housing 100 is constructed as a hollow elongate shell of rigid material such as from heavy gage metal or impact resistant plastic. The housing 100 prevents damage to the power strip that may result from the hazards of a construction site, such as flying debris or dropped tools. The housing 100 is preferably surrounded at its outer edges and opposite ends by a protective, resilient overmold 110. This overmold, constructed of rubber for example, serves to further protect the power strip from damage and preferably includes ridges 120 for easy gripping. The overmold 100 also preferably includes a handle 130 for easy transportation of the power strip. The handle may also be used to hang the power strip in a convenient location.

The housing 100 preferably supports a plurality of AC outlets, or sockets, 140 preferably arranged on the sides of the power strip and spaced apart sufficiently to accept plugs of different sizes. Internally, the power strip has wiring and other electrical components to electrically connect the power cord 10 with the AC sockets 140 so that the sockets are in electrical communication with the power cord. When the male end 20 of the cord 10 is connected to a power supply, it will supply power to the plurality of AC sockets. The power strip has a switch 150 to turn off power to the AC sockets 140. The switch 150 is preferably a 15 amp lighted switch which is connected to an internal circuit breaker as known in the art. The wiring and other electrical components of the power strip (or trouble-light) of the present invention will be discussed further with reference to FIG. 4 which shows how the 12 volt DC socket 160 can be integrated into a several different types of products.

The housing 100 also preferably supports a 12 volt DC socket 160. The DC socket 160 is supplied power from a 12 volt converter that preferably includes a transformer, a rectifier, and appropriate filters. The converter is wired to the power cord so that the power cord supplies power to the converter. The DC socket 160 is also connected to the converter and configured and adapted to supply 12 VDC electrical power to electrical devices that require 12 VDC for operation, recharging, or otherwise. The 12 VDC socket 160 is preferably the type commonly found in automobiles for lighting cigarettes and powering devices within the automobile (e.g. cellular phones, radar detectors, CB radios, and the like). Accordingly, charging devices for these personal electronic devices are available with 12 VDC adaptors designed to fit into the DC socket 160. The 12 VDC socket 160 also has a cover 170 which keeps out unwanted debris when the DC socket 160 is not in use. The cover 170 may be permanently attached to the power strip so that it cannot be separated from the power strip. Otherwise, the cover 170 can be removed from the opening of the DC socket 160 to allow the DC socket 160 to receive a 12 VDC adaptor. The above mentioned switch 150 may also be configured and adapted to turn off power to the 12 VDC socket. In the alternative, separate switches may be provided for the 12 VDC socket and one, or more, of the AC sockets 140.

Adjacent to the 12 VDC socket 160 on the housing 100 is a cradle 180 configured and adapted to receive and hold a portable phone, or other 12 VDC device. The cradle 160 preferably comprises a recess in the housing 100 sufficiently large to accommodate most standard portable phones. The cradle 180 is preferably about 1.5 inches in width and about 1.5 inches in depth. The cradle 180 provides, inter alia, a place to leave the phone while it is charging without leaving the phone on the ground where it may be scratched or stepped on. Foam rubber, or other elastomeric materials, may line the cradle 180 to provide flexibility in the types of devices which may be received by the cradle 180. Although the 12 VDC socket 160 and cradle 180 are discussed in connection with a charger for a portable phone, one skilled in the art will recognize that they may be used with a variety of personal electronic devices such as pagers, personal digital assistants (PDAs), wireless e-mail devices, Pocket PCs, etc. In an alternative embodiment, the power strip may include the AC sockets 140 and the cradle 180, without necessarily including the 12 VDC socket 160 and the 12 VDC converter.

Turning now to FIG. 3, an elevation view of an end of housing 100 is illustrated. The housing 100 of the power strip preferably comprises a flat bottom portion 190, two vertical side portions 200, two diagonal portions 210 that present the electrical outlets 140 to the user, and a top portion 212 which presents the switch 140 and the 12 VDC socket 160 to the user. The top portion may also define the recessed cradle 180. The two diagonal portions 210 allow users to easily plug devices into the power strip. The current embodiment also allows adequate spacing between the sockets 140 so that numerous devices may be plugged in to the power strip without interfering with each other. The sockets 140 are preferably at a 45 degree angle to the bottom of the power strip.

Figure 4:
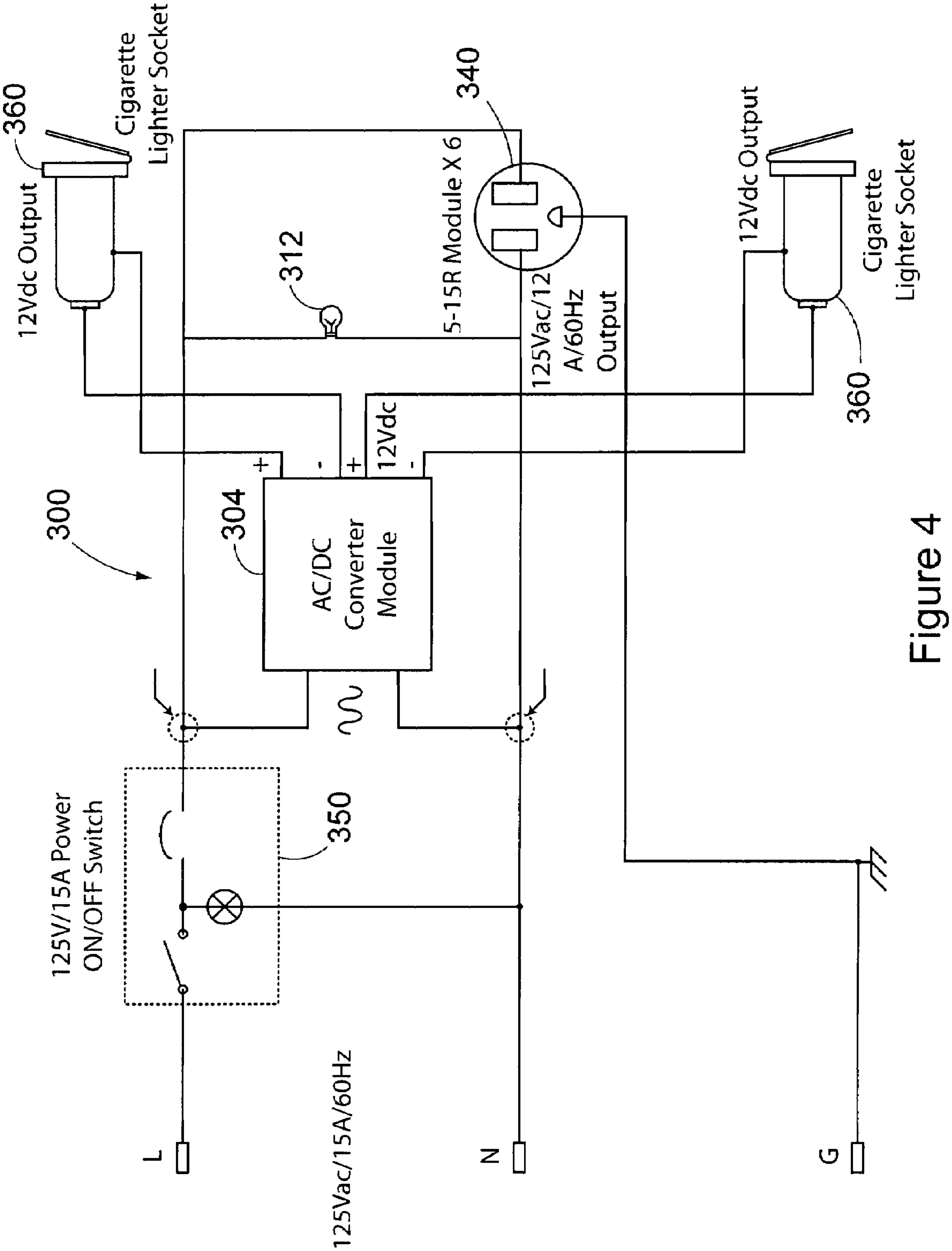
FIG. 4 is a schematic of a trouble-light circuit constructed in accordance with the principles of the present invention.

Turning now to FIG. 4, a schematic for both a power strip and trouble light is illustrated. FIG. 4 shows how the 12 VDC socket 360 can be integrated into several different types of products. The exemplary circuit 300 includes an on/off switch 350, an AC/DC converter 304, an AC outlet 340, a cigarette lighter socket 360, and a light 312. The switch 350, the converter 304, the AC outlet 340, the 12 VDC socket 360, and the light 312 are electrically interconnected as shown. Typically, these components will be housed within, and coupled to, the housing 100 (of FIG. 1). Of course, portions of these components may be visible, or accessible, from the exterior of the housing 100. The switch 350, the converter 304, the outlet 340, and the light 312 are preferably rated for at least 120 VAC. A wide variety of other commonly found power standards (including, but not limited to, 110 VAC, 220 VAC, 240 VAC, 460 VAC, and 480 VAC) may also be accommodated by the circuit 300. Also, the AC portion of the circuit 300 may be configured and adapted to accept multi-phase external power. In these multi-phase embodiments, the AC outlets 340 may be multi-phase outlets. In the alternative, the AC outlets 340 may be single phase outlets, each provided a single phase of external power by the circuit 300. Also, the circuit 300 can accommodate AC power having a different frequency than the 60 Hz AC power commonly encountered in the United States. For instance, the circuit 300 (in particular, the converter 304) can accommodate input power having a frequency of 50 Hz. The flexibility of the circuit 300 in accommodating many power standards allows the circuit 300 to be used in a variety of locals (e.g. foreign countries).

Preferably, the AC portion of the circuit 300 is configured and adapted to accommodate at least, but not limited to, lights 312 that draw 100 watts and that fit in conventional light sockets. Also preferably, the switch 350 includes a power indicator to allow the user to visually determine whether external power is available to the circuit 300. Moreover, the switch 350 includes a fuse, a ground fault interrupter, or other current interruption device in preferred embodiments. The switch 350, as shown, is connected in a manner so that it controls the current flow to the remaining components of the circuit 300 although the switch 350 could control the current to a portion of the circuit 300 instead (e.g. the DC converter 304, the AC socket 340, the DC socket 360, or the light 312). Those skilled in the art will recognize that individual switches for portions of the circuit 300 may be provided instead of, or in addition to, the switch 350.

In one preferred embodiment, a trouble light is provided that includes the switch 350, the DC converter 304, the light 312, one or more 12 VDC sockets 360. Preferably, the trouble light of the current embodiment includes one or more AC outlets 340. In another preferred embodiment, the present invention provides a power strip that includes the switch 350, the DC converter 304, one or more 12 VDC sockets 360, and six AC outlets 340.

In view of the foregoing, it will be seen that the several advantages of the invention are achieved and attained. More particularly, power strips and trouble lights have been provided that include a convenient 12 VDC power source for a variety of electronic devices. Likewise, methods of powering 12 VDC devices have been provided. In the construction industry, in particular, time and labor that would otherwise be expended trying to maintain a charge on portable devices is saved and made available for more profitable activities.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed:

1. A power strip comprising:

a housing having a bottom portion, two vertical side portions that extend upwardly from opposite sides of the bottom portion, two diagonal portions that extend upwardly at angles from the two side portions, and a top portion that extends between the two diagonal portions;

a power source coupled to the housing and adapted to receive electrical alternating current power;

at least one alternating current power outlet mounted on a diagonal portion of the housing and communicating with the power source to receive at least a portion of the electrical alternating current power;

an alternating current to 12 VDC converter coupled to the housing and communicating with the power source to convert at least a portion of the electrical alternating current power to 12 VDC power; and a 12 VDC power outlet communicating with the converter to receive at least a portion of the 12 VDC power.

2. The power strip according to claim 1, further comprising:

a cradle recessed into the top portion and the diagonal side portions of the housing and adapted to hold a device requiring 12 VDC power to operate the device.

3. The power strip according to claim 1, further comprising:

a switch electrically interposed between the power source and at least one of the alternating current power outlet and the 12 VDC power outlet, the switch being operable to connect and disconnect the power source and the at least one of the alternating current power outlet and the 12 VDC power outlet.

4. The power strip according to claim 1, further comprising:

the 12 VDC power outlet being a first 12 VDC power outlet, the power strip including a second 12 VDC power outlet communicating with the converter to receive at least a portion of the converted 12 VDC power.

5. The power strip according to claim 1, further comprising:

the power source being adapted to receive alternating current power having a nominal voltage selected from the group consisting of 110 VAC, 120 VAC, 220 VAC, 240 VAC, 460 VAC, and 480 VAC.

6. The power strip according to claim 1, further comprising:

the power source being adapted to receive alternating current having at least one phase.

7. The power strip according to claim 1, further comprising:

the power source being adapted to receive alternating current power having a frequency of 50 Hz.

8. The power strip according to claim 1, further comprising:

the at least one alternating current power outlet being a first alternating current power outlet, the power strip including a second alternating current power outlet communicating with the power source to receive at least a portion of the electrical alternating current power.

9. The power outlet according to claim 1, further comprising:

the power source including at least one of a male plug and a power cord.

10. A power strip comprising:

a housing;

a power source coupled to the housing and adapted to receive electrical alternating current power;

at least one alternating current power outlet coupled to the housing and communicating with the power source to receive at least a portion of the electrical alternating current power;

an alternating current to 12 VDC converter coupled to the housing and communicating with the power source to convert at least a portion of the electrical alternating current power to 12 VDC power;

a 12 VDC power outlet communicating with the converter to receive at least a portion of the 12 VDC power;

the housing having a hollow elongate rigid shell with a pair side portions and a top portion that extend along a length of the housing between opposite first and second ends of the housing; and a protective, resilient overmold covering over the opposite first and second ends of the housing.

11. The power strip according to claim 10, further comprising:

the housing having outer edges that extend around the housing; and, the protective, resilient overmold extending along the pair of side portions along the length of the housing and surrounding the outer edges of the housing.

12. The power strip according to claim 10, further comprising:

a handle on the housing, the handle being an integral extension of the protective, resilient overmold.

13. The power strip according to claim 10, further comprising:

the overmold completely covering over the opposite first and second ends of the housing.

14. A power strip comprising:

a housing having a bottom portion, two vertical side portions that extend upwardly from opposite sides of the bottom portion, two diagonal portions that extend upwardly at angles from the two side portions, and a top portion that extends between the two diagonal portions;

a power source coupled to the housing and adapted to receive electrical alternating current power;

at least one alternating current power outlet mounted on a diagonal position of the housing and communicating with the power source to receive at least a portion of the electrical alternating current power; and a cradle recessed into the top portion and the diagonal portions of the housing and adapted to hold a device requiring 12 VDC power to operate the device.

15. The power strip according to claim 14, further comprising:

an alternating current to 12 VDC converter coupled to the housing and communicating with the power source to convert the electrical alternating current power to 12 VDC power; and a 12 volt power outlet communicating with the converter to receive at least a portion of the 12 VDC power.

16. A power strip comprising:

a housing;

a power source coupled to the housing and adapted to receive electrical alternating current power;

at least one alternating current power outlet coupled to the housing and communicating with the power source to receive at least a portion of the electrical alternating current power;

a cradle defined by the housing and adapted to hold a device requiring 12 VDC power to operate the device;

the housing having a hollow elongate rigid shell with a pair of side portions and a top portion that extend along a length of the housing between opposite first and second ends of the housing; and a protective, resilient overmold covering over the opposite first and second ends of the housing.

17. The power strip according to claim 16, further comprising:

the housing having outer edges that extend around the housing; and, the protective, resilient overmold extending along the pair of side portions along the length of the housing and surrounding the outer edges of the housing.

18. The power strip according to claim 16, further comprising:

a handle on the housing, the handle being an integral extension of the protective, resilient overmold.

19. The power strip according to claim 16, further comprising:

the overmold completely covering over the opposite first and second ends of the housing.

20. A trouble light comprising:

a housing;

a power source coupled to the housing and adapted to receive electrical alternating current power;

a light coupled to the housing and communicating with the power source to receive at least a portion of the electrical alternating current power;

an alternating current to 12 VDC converter coupled to the housing and communicating with the power source to convert at least a portion of the electrical alternating current power to 12 VDC power;

a 12 volt power outlet communicating with the converter to receive at least a portion of the 12 VDC power; and, a cradle recessed into the housing at a position adjacent to and separate from the 12 volt power outlet, the cradle being dimensioned to receive a separate portable 12 volt device.

21. The trouble light according to claim 20, further comprising:

at least one alternating current power outlet coupled to the housing and communicating with the power source to receive at least a portion of the electrical alternating current power.

* * * * *